United States Patent
Maegawa

(10) Patent No.: US 8,529,273 B2
(45) Date of Patent: Sep. 10, 2013

(54) FEMALE TERMINAL AND CHARGING CONNECTOR

(75) Inventor: Akihiro Maegawa, Yokkaichi (JP)

(73) Assignee: Sumitomo Wiring Systems, Ltd. (JP)

( * ) Notice: Subject to any disclaimer, the term of this patent is extended or adjusted under 35 U.S.C. 154(b) by 256 days.

(21) Appl. No.: 13/032,010

(22) Filed: Feb. 22, 2011

(65) Prior Publication Data

US 2011/0223808 A1    Sep. 15, 2011

(30) Foreign Application Priority Data

Mar. 11, 2010   (JP) ................................. 2010-054799

(51) Int. Cl.
*H01R 33/00*   (2006.01)

(52) U.S. Cl.
USPC .............................. 439/34; 439/206; 439/587

(58) Field of Classification Search
USPC ........................................... 439/587, 34, 206
See application file for complete search history.

(56) References Cited

U.S. PATENT DOCUMENTS

| | | | |
|---|---|---|---|
| 4,626,721 A * | 12/1986 | Ouchi | 310/71 |
| 5,458,496 A | 10/1995 | Itou et al. | |
| 5,556,284 A | 9/1996 | Itou et al. | |
| 5,577,920 A | 11/1996 | Itou et al. | |
| 5,637,977 A | 6/1997 | Saito et al. | |
| 5,769,648 A * | 6/1998 | Hayashi | 439/206 |
| 5,816,643 A | 10/1998 | Itou et al. | |
| 5,820,395 A * | 10/1998 | Hashizawa | 439/271 |
| 5,848,909 A * | 12/1998 | Tsai | 439/206 |
| 5,921,803 A | 7/1999 | Mori | |
| 6,325,633 B1 * | 12/2001 | Ito et al. | 439/34 |
| 6,371,768 B1 * | 4/2002 | Neblett et al. | 439/34 |
| 6,843,677 B2 * | 1/2005 | Fukuda | 439/374 |
| 7,201,592 B2 * | 4/2007 | Hata | 439/206 |
| 8,128,438 B2 * | 3/2012 | Bernard et al. | 439/701 |

FOREIGN PATENT DOCUMENTS

| | | |
|---|---|---|
| DE | 102007015696 | 10/2008 |
| EP | 0665610 | 8/1995 |
| JP | 2002-75543 | 3/2002 |
| JP | 2002075543 | 3/2002 |

\* cited by examiner

*Primary Examiner* — Truc Nguyen
(74) *Attorney, Agent, or Firm* — Gerald E. Hespos; Michael J. Porco; Matthew T. Hespos

(57) ABSTRACT

A female terminal (20) has a main portion (21). A contact-member accommodating portion (22) projects forward from the main portion (21) for accommodating a contact member (23) inside. The contact member (23) has circumferentially arranged contact pieces (23A) extending in a connecting direction with a male terminal (60). Intermediate parts of the contact pieces (23A) in an extending direction are curved radially inwardly, and the curved parts of the contact pieces (23) resiliently contact and hold the male terminal (60). The contact-member accommodating portion (22) has a front wall (22A) and a side wall (22B) between the front wall (22A) and the main portion (21). An entrance hole (22C) for the male terminal (60) is formed in the front wall (22A), and a first discharge hole (25A) for allowing the inside and outside of the contact-member accommodating portion (22) to communicate is formed in the side wall (22B).

10 Claims, 5 Drawing Sheets

FEMALE TERMINAL AND CHARGING CONNECTOR

BACKGROUND OF THE INVENTION

1. Field of the Invention

The invention relates to a female terminal and a charging connector.

2. Description of the Related Art

U.S. Pat. No. 5,637,977 discloses a charging connector connectable to a vehicle-side connector in a vehicle. The connector has terminal accommodating portions for accommodating female terminals that are connectable to bar-shaped male terminals. Each female terminal has a contact-member accommodating portion for accommodating a contact member that has resilient contact pieces for contacting and holding the male terminal. The contact-member accommodating portion extends forward from a main body, and an insertion hole is formed in a front end portion of the contact-member accommodating portion for allowing the insertion of the male terminal. This female terminal is similar to a louver terminal disclosed, for example, in Japanese Unexamined Patent Publication No. 2002-75543.

A charging connector may be used outdoors, and hence is subjected to a muddy water test in which the charging connector is immersed in muddy water, dried and then repeatedly connected to and separated from a vehicle-side connector. Thus, the charging connector is required to have durability for the muddy water test.

A water drain hole is formed in the terminal accommodating portion of the above-described charging connector so that muddy water can be drained to the outside. However, there is no water drain hole in the contact-member accommodating portion, and thus muddy water cannot be drained to the outside of the contact-member accommodating portion. Dried muddy water forms mud deposits on the contact pieces of the contact member. If the female terminal is connected and separated repeatedly, plating on the contact member may be peeled off or the contact member may be scratched.

The invention was developed in view of the above situation and an object thereof is to discharge muddy water to the outside of a contact-member accommodating portion and, hence, protect a contact member.

SUMMARY OF THE INVENTION

The invention relates to a female terminal into which a male terminal can be fit. The female terminal has a main body and a contact-member accommodating portion that projects forward from the main body. A contact member is accommodated in the contact-member accommodating portion and can resiliently contact and hold the male terminal. A front wall is formed at a front part of the contact-member accommodating portion and a side wall extends between the front wall and the main portion. An entrance hole is formed in the front wall for allowing the entrance of the male terminal into the contact-member accommodating portion. At least one first discharge hole is formed in the side wall for allowing the inside and outside of the contact-member accommodating portion to communicate. Accordingly, muddy water that enters the contact-member accommodating portion can be discharged to the outside through the first discharge hole. Thus, it is possible to protect the contact member and to ensure performance that can endure a muddy water test.

The contact member preferably has circumferentially spaced contact pieces that extend substantially in a connecting direction with the male terminal. Intermediate parts of the contact pieces in an extending direction are curved radially inwardly, and the curved parts of the contact pieces can resiliently contact and hold the male terminal.

The side wall may be substantially cylindrical, and a plurality of circumferentially spaced first discharge holes may be formed in the side wall.

Accordingly, muddy water that enters the contact-member accommodating portion can be discharged to the outside through the plurality of first discharge holes. Therefore the muddy water can be discharged efficiently.

A female-side circumferential flange may project out from the main portion for contacting a rear end opening edge of a cavity for limiting forward movement of the female terminal fitting into the cavity.

The female terminal may further comprise a wire connection portion to be connected to a wire. The wire connection portion may comprise at least one barrel adjacent to the main portion. A core exposed at an end of the wire may be accommodated in the barrel and connected thereto by crimping, folding, bending or deforming the barrel.

An outwardly open wire view window may penetrate through the wire connection portion. A core can be viewed through the wire view window to confirm that the wire is inserted to a specified depth in the wire connection portion.

The invention also relates to a charging connector connectable to a vehicle-side connector in a vehicle. The charging connector has at least one of the above-described female terminals; and at least one terminal accommodating portion to accommodate the female terminal therein. The charging connector also has an insertion hole for receiving a male terminal formed at a position corresponding to the entrance hole.

At least one second discharge hole preferably is formed in a peripheral wall of the terminal accommodating portion surrounding or adjacent to the first discharge hole for allowing the inside and outside of the terminal accommodating portion to communicate. Accordingly, muddy water can be discharged to the outside of the contact-member accommodating portion, i.e. to the inside of the terminal accommodating portion through the first discharge hole and then further discharged to the outside of the terminal accommodating portion through the second discharge hole. On the other hand, the muddy water could not be discharged efficiently through the first discharge hole if the muddy water stayed in the terminal accommodating portion. However, according to the invention, the muddy water can be discharged from the inside to the outside of the terminal accommodating portion through the second discharge hole, and therefore the muddy water can be discharged efficiently through the first discharge hole.

A clearance may be set between the peripheral wall of the terminal accommodating portion surrounding the first discharge hole and the female terminal. Accordingly, muddy water discharged to the clearance through the first discharge hole can be discharged to the outside through the second discharge hole since the first and second discharge holes communicate via the clearance.

These and other objects, features and advantages of the invention will become more apparent upon reading of the following detailed description of preferred embodiments and accompanying drawings. It should be understood that even though embodiments are separately described, single features thereof may be combined to additional embodiments.

DETAILED DESCRIPTION OF THE PREFERRED EMBODIMENTS

Figure 1:
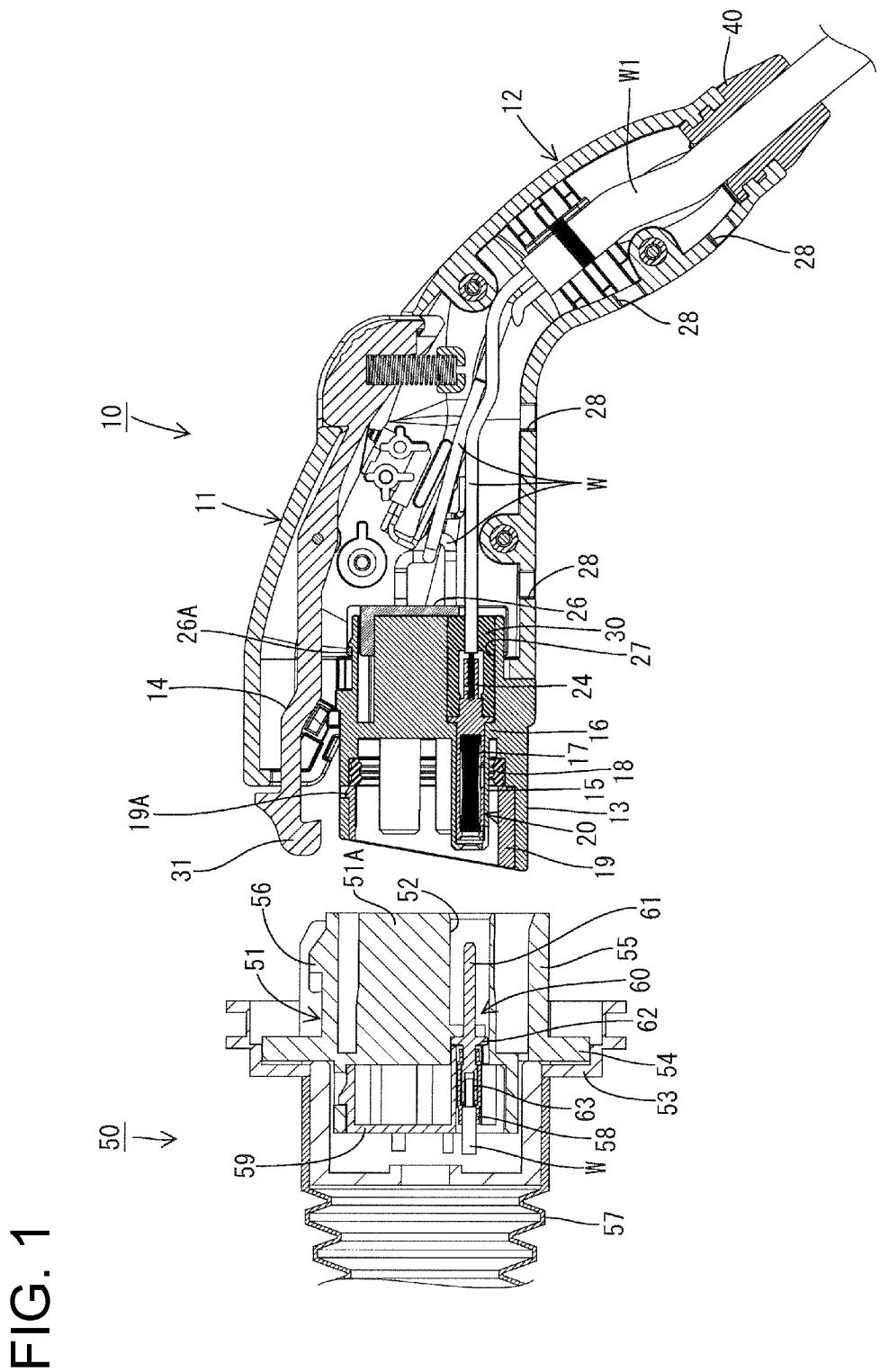
FIG. 1 is a longitudinal section showing a state before a vehicle-side connector and a charging connector are connected in a first embodiment.
Figure 2:
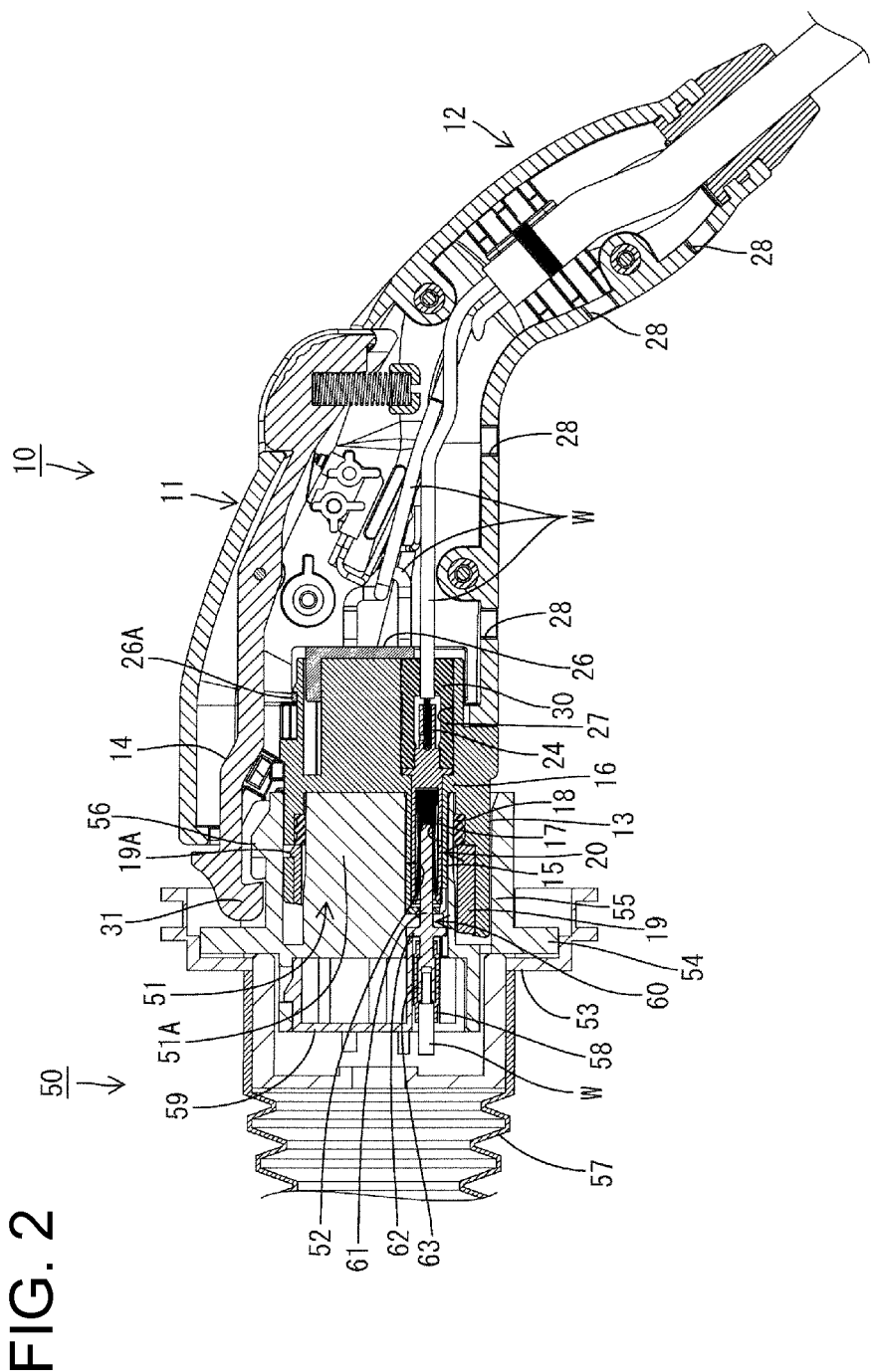
FIG. 2 is a longitudinal section showing a state where the vehicle-side connector and the charging connector are connected.
Figure 3:
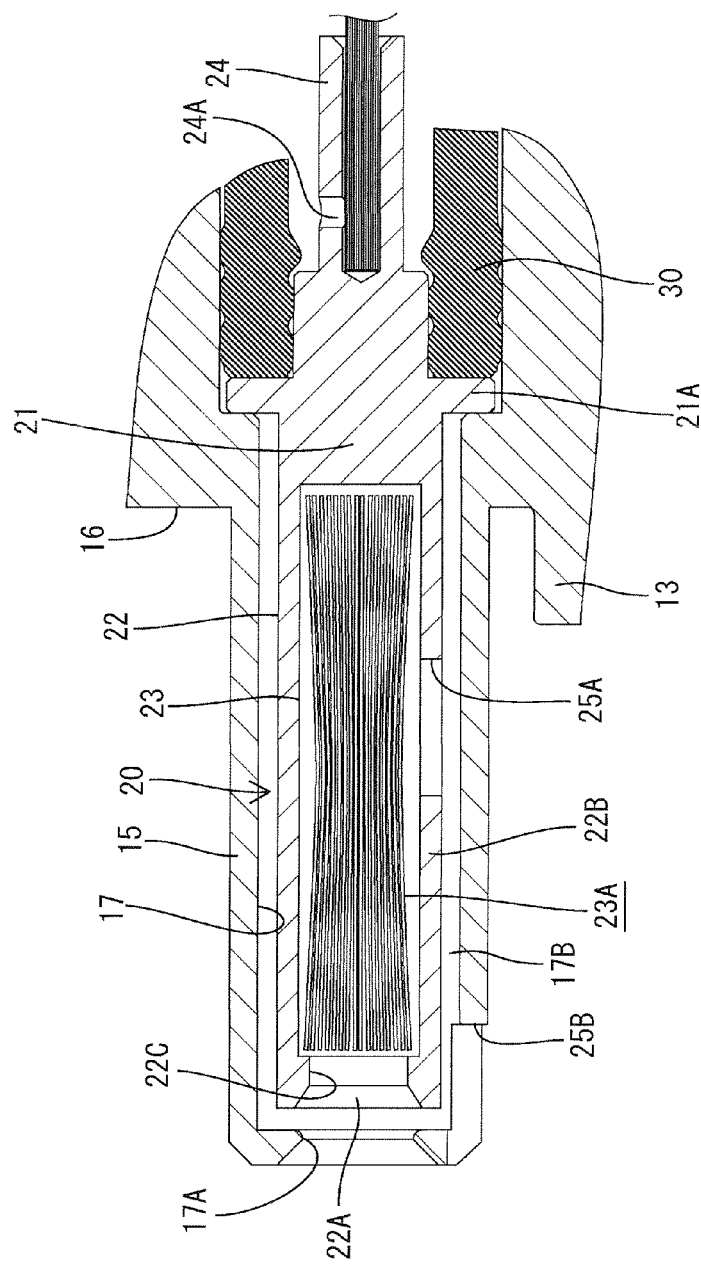
FIG. 3 is an enlarged longitudinal section showing surroundings of a female terminal in FIG. 1.

A first embodiment of the invention is described with reference to FIGS. 1 to 3. A charging connector 10 of this embodiment is connectable with a vehicle-side connector 50. In the following description, a front end or a forward direction refers to a connection direction of the charging connector 10 with the vehicle-side connector 50. The charging connector 10 is substantially gun-shaped and has a main body 11 at a front part and a grip 12 extending obliquely down from the rear of the main body 11, as shown in FIG. 1. The main body 11 and the grip 12 may be molded unitarily of synthetic resin. A substantially cylindrical receptacle 13 projects forward at the front of the main body 11. Further, a lever 14 is accommodated at an upper side of the interior of the main body 11, and a front end of the lever is exposed to the outside from the upper front of the main body 11.

The receptacle 13 is formed separately from the main body 11, and is fixed to the main body 11 by an unillustrated locking means. Tubular terminal accommodating portions 15 are provided in the receptacle 13 and project forward from a back wall 16 of the receptacle 13. Cavities 17 are formed in the terminal accommodating portions 15 for accommodating female terminals 20. A clearance 17B is set between the outer circumferential surface of the female terminal 20 accommodated in the cavity 17 and the inner wall of the terminal accommodating portion 15. The clearance 17B is formed because the cavity 17 is slightly larger than the outer shape of the female terminal 20 in view of a variation in the finished dimensions of the cavity 17 caused by molding.

Each cavity 17 is open at the rear of the back wall 16 of the receptacle 13. The cavity 17 defines a space for accommodating the female terminal 20 and is formed by the inner wall of the terminal accommodating portion 15. An insertion hole 17A penetrates the front wall of the cavity 17 and can receive a male terminal 60. At least one second discharge hole 25B penetrates through a lower side of the inner wall of the cavity 17 at or near the front end. Muddy water or the like that has entered the terminal accommodating portion 15 may be discharged to the outside through the second discharge hole 25B.

A cylindrical resilient rubber ring 18 is mounted along the inner circumferential surface of the receptacle 13 and a holder 19 is mounted before the rubber ring 18 to retain the rubber ring 18. The holder 19 has substantially the same cylindrical shape as the rubber ring 18 and includes at least one lock 19A engageable with an inner side of the receptacle 13. The holder 19 is mounted substantially along the inner circumferential surface of the receptacle 13 by the lock 19A.

A mounting portion for the holder 19 on the inner circumferential surface of the receptacle 13 has a larger diameter than the back side of the rubber ring 18. The inner circumferential surface of the mounted holder 19 and the inner circumferential surface of the receptacle 13 behind the rubber ring 18 are substantially aligned and flush. Lips of the rubber ring 18 project radially inward of the inner circumferential surface of the holder 19. The vehicle-side connector 50 includes a vehicle-side housing 51 connectable to the charging connector 10. The vehicle-side housing 51 is made e.g. of synthetic resin and has a main body 51A that is insertable into the receptacle 13 so that the outer circumferential surface of the main body 51A closely contacts the lips of the rubber ring 18 to provide waterproofing between the connectors 10 and 50.

Vehicle-side cavities 52 are formed in the housing main body 51A for accommodating the respective male terminals 60. The vehicle-side housing 51 is to be mounted in a mounting opening 53 in a vehicle body. A mounting plate 54 projects from the outer periphery of the vehicle-side housing 51, and the vehicle-side housing 51 is mounted and fixed to the mounting opening 53 by placing the mounting plate 54 along the opening edge of the mounting opening 53 and fixing it.

A fitting tube 55 is provided circumferentially around the outer periphery of the main body 51A. The fitting tube 55 projects forward from the mounting plate 54, so that the receptacle 13 fits between the housing main body 51A and the fitting tube 55. A lock projection 56 is provided on the upper surface of the fitting tube 55. The lock projection 56 is engageable with a lock 31 at a front end of the lever 14 when the two connectors 10, 50 are connected to hold the connectors 10, 50 in a connected state. A bellows-like grommet 57 is mounted on a rear part of the mounting opening 53 to extend back.

Each vehicle-side terminal 60 has a substantially bar-shaped male-side main portion 61, and a flange 62 projects out from the outer circumferential surface of the main portion 61. The flange 62 contacts the rear wall of the vehicle-side cavity 52 from behind, and the main portion 61 is accommodated into the vehicle-side cavity 52 through this rear wall. A wire barrel 63 is formed at a rear end of the main portion 61. A core of a wire W is placed in the barrel 63 and fixed by crimping, folding, bending or deforming. Further, a heat shrinkable tube 58 is mounted over a crimping part of the barrel 63 to protect the crimping part of the barrel 63 from water. A vehicle-side retainer 59 is mounted in a rear part of the vehicle-side housing 51 and engages the flanges 62 of the male terminals 60 from behind to prevent the male terminals 60 from coming out backward.

Wires W extend back from the female terminals 20 and are drawn out to the outside through the interiors of the connector main body 11 and the grip 12. More particularly, the wires W arranged in correspondence with the respective female terminals 20 are bundled into one cable W1 and covered by an outer sheath in the grip 12. The cable W1 is fixed by a cable grip ring (not shown) or the like in the grip 12 and fixed by a bush 40 near a rear end of the grip 12.

The bush 40 is held in close contact with the inner circumferential surface of the rear end opening of the grip 12 and the outer circumferential surface of the cable W1 to prevent water from entering the interior of the grip 12 through the rear end of the grip 12. Water drain holes 28 are formed in the lower surfaces of the connector main body 11 and the grip 12. Thus, any water that enters the interior of the connector main body 11 and the grip 12 can escape to the outside through the water drain holes 28.

A surrounding structure of the female terminal 20 of the charging connector 10 is described with reference to FIG. 3. The female terminal 20 includes a substantially cylindrical or tubular main portion 21, and a substantially cylindrical or tubular contact-member accommodating portion 22 substantially extends forward from the main portion 21. A contact member 23 is accommodated in the contact-member accommodating portion 22 and is composed of a plurality of contact pieces 23A. The contact member 23 of this type is called a louver terminal in some cases.

Specifically, the contact pieces 23A of the contact member 23 extend forward from the main portion 21 and are arranged in a circumferential direction about an axial center of the female-side main portion 21. A central part of each contact piece 23A in forward and backward directions is curved radially inwardly. The male terminal 60 that is fit in the female terminal 20 is held by the contact pieces 23A and curved parts are resiliently held in contact with the male terminal 60. Thus, the female terminal 20 and the male terminal 60 are connected electrically conductively.

A flange portion 21A is provided circumferentially on the outer circumferential surface of the main portion 21 and contacts the rear end opening edge of the cavity 17 to limit forward movement of the female terminal 20 in the cavity 17. On the other hand, rubber plugs 30 are accommodated behind the flanges 21A, and a back retainer 26 is provided behind the rubber plugs 30 for retaining the rubber plugs 30.

The rubber plugs 30 are accommodated in rubber-plug accommodating portions 27 arranged behind and coaxially with the terminal accommodating portions 15. The back retainer 26 includes locking pieces 26A that engage projections on the upper surfaces of the rubber-plug accommodating portions 27. The locking pieces 26A prevent backward movement of the back retainer 26 and also backward movements of the rubber plugs 30 and the female terminals 20.

A wire connection portion is formed behind and adjacent the main portion 21 and comprises a substantially cylindrical female-side barrel 24 with an open rear end. A core exposed at an end of a wire W is accommodated in the female-side barrel 24 and the barrel 24 then is crimped or deformed into electrically conductive connection with the core of the wire W. A wire view window 24A penetrates through an upper part of the female-side barrel 24. The core can be seen through the wire view window 24A to confirm that the wire W is inserted to a specified depth in the female-side barrel 24.

A front wall 22A is formed at a front end of the contact-member accommodating portion 22 and a side wall 22B is formed between the front wall 22A and the main portion 21. An entrance hole 22C is formed in the front wall 22A for allowing entry of the male terminal 60 into the contact-member accommodating portion 22. The entrance hole 22C is substantially coaxial with the insertion hole 17A in the front wall of the cavity 17 and has an inner diameter somewhat larger than the insertion hole 17A. Thus, the male terminal 60 can be inserted through the insertion hole 17A and the entrance hole 22C and into the contact-member accommodating portion 22.

The side wall 22B of the contact-member accommodating portion 22 is substantially cylindrical and extends in forward and backward directions while forming a clearance 17B to the inner wall of the terminal accommodating portion 15. First discharge holes 25A penetrate through the side wall 22B. In this embodiment, three first discharge holes 25A are arranged in a circumferential direction, so that muddy water or the like can be discharged to the clearance 17B through the first discharge holes 25A.

The second discharge hole 25B of the terminal accommodating portion 15 is formed in a peripheral wall surrounding the first discharge holes 25A of the contact-member accommodating portion 22. Thus, muddy water or the like discharged from the inside of the contact-member accommodating portion 22 to the clearance 17B through the first discharge holes 25A can be discharged to the outside through the second discharge hole 25B of the terminal accommodating portion 15. In other words, the first and second discharge holes 25A and 25B communicate with each other via the clearance 17B. Thus, muddy water will not stay in the terminal accommodating portion 15 and any muddy water or the like that enters the inside of the contact-member accommodating portion 22 can be discharged efficiently to the outside of the terminal accommodating portion 15.

The receptacle 13 enters between the housing main body 51A when the two connectors 10, 50 are connected and the fitting tube 55 and the terminal accommodating portions 15 enter the vehicle-side cavities 52. Simultaneously, the male terminals 60 are inserted into the respective contact-member accommodating portions 22 through the insertion holes 17A of the terminal accommodating portions 15 and the entrance holes 22C of the contact-member accommodating portions 22. Thereafter, the two connectors 10, 50 reach a connected state so that the male terminals 60 are held resiliently by the contact pieces 23A of the contact members 23 to connect the terminals 20, 60 connect electrically. At this time, the lock 31 engages the lock projection 56 to lock the two connectors 10, 50 in the connected state.

Foreign matter, such as mud, deposited on the surfaces of the male terminals 60 is removed by the contact pieces 23A during a connecting operation of the two connectors 10, 50. The connectors 10, 50 often are connected outdoors, and thus muddy water or the like is likely to enter the female terminals 20. Muddy water or the like that enters the contact-member accommodating portion 22 is discharged through the first discharge holes 25A, to this clearance 17B, through the second discharge holes 25B and to the outside of the terminal accommodating portion 15.

The two connectors 10, 50 can be separated by pushing down on a rear end portion of the lever 14 to lift the lock portion 31 up and out of engagement with the lock projection 56. The two connectors 10, 50 then are pulled apart so that the male terminals 60 are withdrawn from the contact-member accommodating portions 22 and the two connectors 10, 50 are separated. The rear end of the lever 14 then is released, and the lever 14 returns to its horizontal posture by a spring force of a coil spring.

As described above, the first discharge holes 25A are formed in the side wall 22B of the contact-member accommodating portion 22 and muddy water or the like is discharged through the first discharge holes 25A to the clearance 17B. Therefore durability performance in a muddy water test is obtained. Further, muddy water or the like discharged to the clearance 17B can be discharged through the second discharge holes 25B and to the outside of the terminal accommodating portion 15. Thus, it is easier to discharge the muddy water from the inside of the contact-member accommodating portion 22. Further, the disposition of the first discharge holes 25A in the side wall 22B of the contact-member accommodating portion 22 facilitates the discharge of muddy water.

Figure 4:
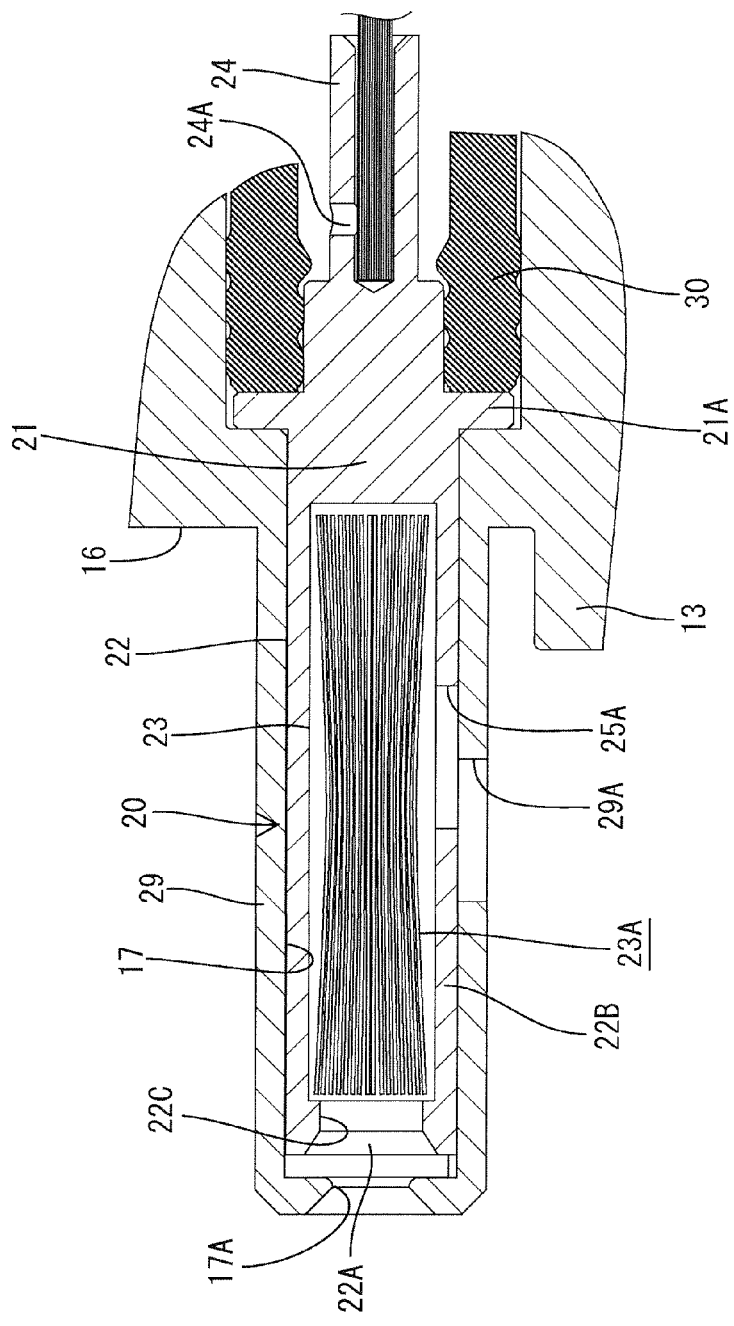
FIG. 4 is an enlarged longitudinal section showing surroundings of a female terminal corresponding to FIG. 3 in a second embodiment.

A second embodiment of the invention is described with reference to FIG. 4. This embodiment is obtained by partly changing the construction of the terminal accommodating portions 15 of the first embodiment. Other common constructions, functions and effects are not described to avoid repetitive description. Thus, the similar constructions as in the first embodiment are identified by the same reference numerals. Each terminal accommodating portion 29 of this embodiment has no clearance between the inner wall of the terminal accommodating portion 29 and the outer circumferential surface of a female terminal 20 as shown in FIG. 4. Such a construction could be realized when the terminal accommodating portion 29 is formed smaller than specified due to a dimensional variation during molding. However, even in such a construction, at least one second discharge hole 29A formed in or near a lower part of the terminal accommodating portion 29 and one or more first discharge holes 25A communicate by being partly overlapped. Thus, muddy water or the like that enters a contact-member accommodating portion 22 can be discharged to the outside even if there is no clearance.

Figure 5:
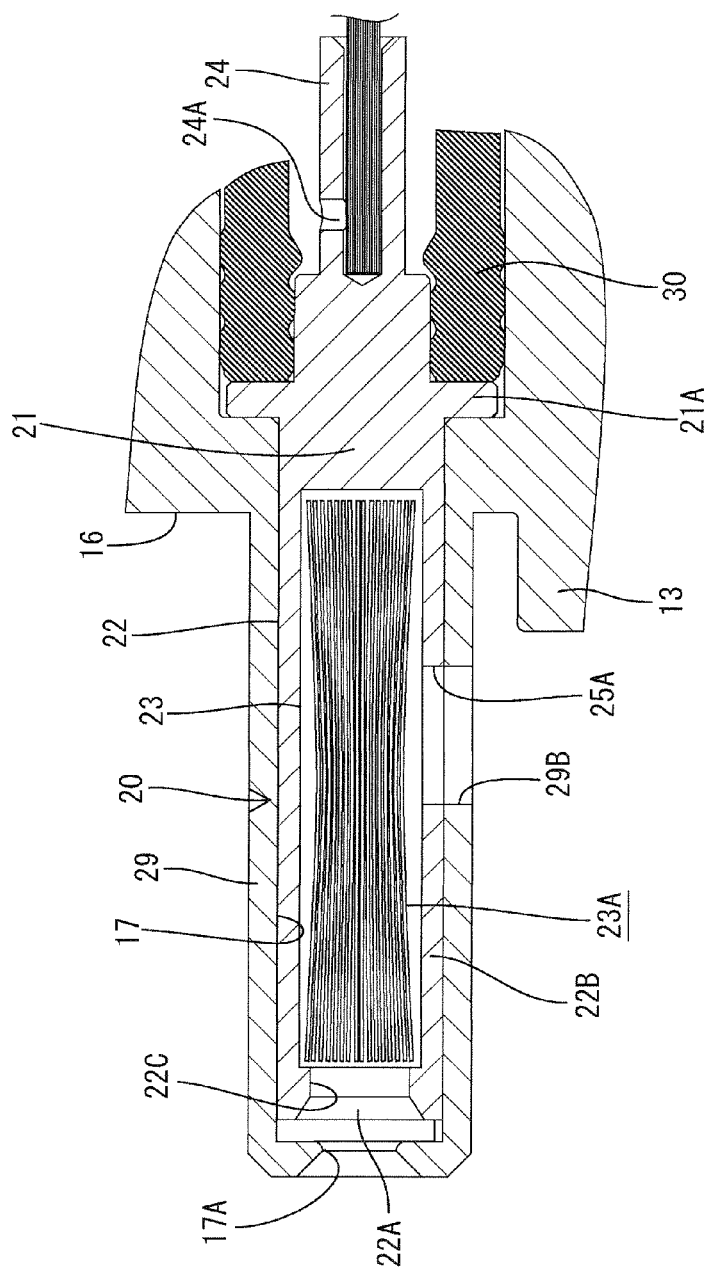
FIG. 5 is an enlarged longitudinal section showing surroundings of a female terminal corresponding to FIG. 3 in a third embodiment.

A third embodiment of the invention is described with reference to FIG. 5. Similar to the second embodiment, the third embodiment is obtained by partly changing the construction of the terminal accommodating portions 15 of the first embodiment. Common constructions, functions and effects are not described to avoid repetitive description and constructions similar to those of the first embodiment are identified by the same reference numerals. Each terminal accommodating portion 29 of this embodiment has no clearance is set between the inner wall of the terminal accommodating portion 29 and the outer circumferential surface of a female terminal 20, as shown in FIG. 5. Further, at least one second discharge hole 29B formed in a lower part of the terminal accommodating portion 29 has substantially the same diameter as and is coaxial with first discharge holes 25A. Thus, an opening area where the first and second discharge holes 29A, 29B communicate can be widened and it becomes easier to discharge to the outside muddy water or the like that has entered a contact-member accommodating portion 22.

The invention is not limited to the above described and illustrated embodiments. For example, the following embodiments are also included in the scope of the invention.

Although the bar-shaped male terminals 60 are illustrated in the above embodiments, the male terminals may be flat plates.

The contact-member accommodating portion 22 has the plurality of first discharge holes 25A in the illustrated embodiments. However, the contact-member accommodating portion may have only one first discharge hole.

Although no clearance is formed in the second and third embodiments, constructions formed with a clearance also are included according to the invention.

What is claimed is:

1. A female terminal into which a male terminal is fittable for achieving an electrically conductive connection, the female terminal comprising:
   a main portion;
   a contact member forward of the main portion, the contact member having a plurality of circumferentially arranged contact pieces extending substantially in a connecting direction with the male terminal, intermediate parts of the contact pieces in an extending direction defining curved parts that curve radially inwardly and configured for resiliently contacting and holding a male terminal;
   a contact-member accommodating portion including a side wall extending forward from the main portion and surrounding the contact member and a front wall forward of the contact member, an entrance hole in the front wall for allowing entry of the male terminal into the contact-member accommodating portion, and at least one first discharge hole formed in the side wall for allowing areas inside and outside of the contact-member accommodating portion to communicate.

2. The female terminal of claim 1, wherein the side wall is substantially cylindrical, and the at least one first discharge hole comprises a plurality of circumferentially arranged first discharge holes formed in the side wall.

3. The female terminal of claim 1, wherein a flange projects out from the main portion for contacting a rear end opening edge of a cavity for limiting forward movement of the female terminal into the cavity.

4. The female terminal of claim 1, further comprising a wire connection portion to be connected to a wire.

5. The female terminal of claim 4, wherein the wire connection portion comprises at least one barrel adjacent to the main portion, wherein a core exposed at an end of the wire is accommodated in the barrel and connected thereto by crimping the barrel.

6. The female terminal according to claim 4, wherein a wire view window penetrates through the wire connection portion so that the core can be viewed through the wire view window to confirm that the wire is inserted to a specified depth in the wire connection portion.

7. A charging connector connectable to a vehicle-side connector provided in a vehicle, comprising:
   at least one female terminal having a main portion, a contact member forward of the main portion and configured for resiliently contacting and holding a male terminal, a contact-member accommodating portion including a side wall extending forward from the main portion and surrounding the contact member and a front wall forward of the contact member, an entrance hole in the front wall for allowing entry of the male terminal into the contact-member accommodating portion, and at least one first discharge hole formed in the side wall for allowing areas inside and outside of the contact-member accommodating portion to communicate;
   a connector main body extending in forward and backward directions;
   a cylindrical receptacle projecting forward at a front end of the main body; and
   at least one terminal accommodating portion in the receptacle having a cavity adapted to at least partly accommodate the female terminal therein and having an insertion hole formed in the at least one terminal accommodating portion at a position aligned with the entrance hole for allowing insertion of the male terminal, and at least one second discharge hole formed in the terminal accommodating portion in communication with the first discharge hole for allowing areas inside the contact-member accommodating portion to communicate with areas outside the terminal accommodating portion.

8. The charging connector of claim 7, further comprising a clearance between the peripheral wall of the terminal accommodating portion and the female terminal, the clearance communicating with the first discharge hole.

9. The charging connector of claim 7, wherein the at least one second discharge hole is formed in a lower part of the terminal accommodating portion and at least partly overlaps with the first discharge hole.

10. The charging connector of claim 7, wherein the at least one second discharge hole is formed in a lower part of the terminal accommodating portion and has substantially the same diameter as the first discharge hole and is substantially coaxial with the first discharge hole.

* * * * *